W. H. FARNHAM.
SNAP FASTENER.
APPLICATION FILED MAR. 30, 1921.
1,387,135.
Patented Aug. 9, 1921.
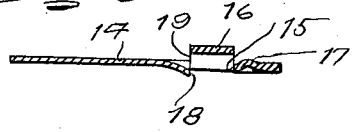
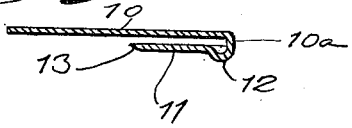
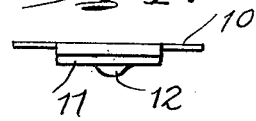
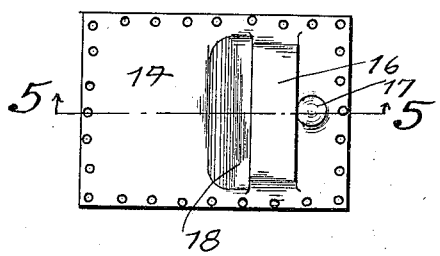
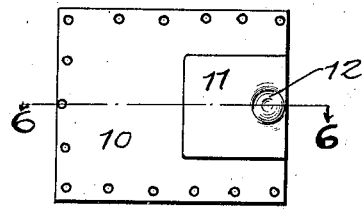
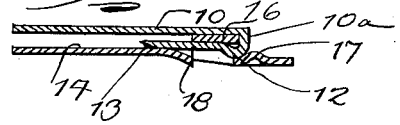
W. H. Farnham.
INVENTOR.
BY Watson E. Coleman
ATTORNEY.

UNITED STATES PATENT OFFICE.

WALTER H. FARNHAM, OF BUCKSPORT, MAINE.

SNAP-FASTENER.

1,387,135.     Specification of Letters Patent.     Patented Aug. 9, 1921.

Application filed March 30, 1921. Serial No. 456,954.

*To all whom it may concern:*

Be it known that I, WALTER H. FARNHAM, a citizen of the United States, residing at Bucksport, in the county of Hancock and State of Maine, have invented certain new and useful Improvements in Snap-Fasteners, of which the following is a specification, reference being had to the accompanying drawings.

This invention relates to snap fasteners and more particularly to a snap fastener of the hook and eye type.

An important object of the invention is to provide a device of this character in which the insertion of the hook is rendered much easier and rapid by the provision of means for guiding the hook through the eye.

A further object of the invention is to provide a hook and eye of this character which may each be formed from an integral sheet of metal.

Other objects and advantages of the invention will become apparent throughout the course of the following description.

In the accompanying drawings, wherein for the purpose of illustration is shown a preferred embodiment of my invention and wherein like reference characters represent like parts throughout, Figure 1 is a plan view of an eye plate constructed in accordance with my invention;

Fig. 2 is a bottom plan view of a hook plate constructed in accordance with my invention;

Fig. 3 is an end elevation of the eye plate;

Fig. 4 is an end elevation of the hook plate;

Fig. 5 is a section on the line 5—5 of Fig. 1;

Fig. 6 is a section on the line 6—6 of Fig. 2, and

Fig. 7 is a longitudinal sectional view showing the hook and eye plates in assembled relation.

Referring now more particularly to the drawings, the numeral 10 indicates a hook plate suitably apertured for the reception of means whereby it may be secured to the article upon which it is to be employed. This plate is provided with an angular extension 10$^a$ terminating in a returned portion 11 substantially paralleling the plate 10. This returned portion is provided at a point adjacent its juncture with the angular extension 10$^a$ with a swaged hump 12, and the extremity of the returned portion 11 is beveled toward the end thereof and toward the plate as at 13 for purposes presently to appear.

The numeral 14 indicates an eye plate having a portion of the metal thereof extending transversely of the plate struck up to form a resultant slot 15, having superposed thereabove a bridge bar 16. The metal at one side of the slot 15 is provided with a swaged hump 17 corresponding in positioning to the swaged hump of the returned portion 11 of the hook plate 10, and the metal at the opposite side of the slot 15 is swaged downwardly at an angle to the plate so that it inclines away from the bridge bar 16, affording intermediate the bridge bar and the plate at one side of the bridge bar, an enlarged opening 19.

In the use of my device when the hook is inserted beneath the bridge bar, the beveled portion thereof coming into contact with the downwardly swaged portion of the eye plate 14 and is guided through the enlarged opening 19 of the plate assuring its correct directioning for proper engagement with the eye plate 14. As the movement of the hook beneath the bridge bar 16 is continued, the swaged hump 12 thereof comes into contact with the swaged hump 17 of the eye plate 14, necessitating the use of force to cause the frictional passage of this hump with the result that the hook comes into position beneath the bridge bar with a snap, and the engagement of the humps 12 and 17 prevents its accidental withdrawal.

Many changes being possible in the shape, size and arrangement of the various parts hereinabove set forth without departing from the spirit of my invention, I do not limit myself to the construction hereinabove set forth except as hereinafter claimed

What I claim is:

1. In combination with an eye plate having a slot and a bridge bar straddling the slot, the plate being downwardly inclined at one side of the slot to form a guiding surface, and a hook plate embodying a hook adapted to engage beneath the bridge bar, the initial engagement of the hook with the bridge bar being made at the opposite side of the bridge bar from the downwardly inclined portion of the plate.

2. In combination with an eye plate having a slot and a bridge bar straddling the slot, the plate being downwardly inclined at one side of the slot to form a guiding surface, and a hook plate embodying a hook adapted to engage beneath the bridge bar, the initial engagement of the hook with the bridge bar being made at the opposite side of the bridge bar from the downwardly inclined portion of the plate, the end of said hook portion being beveled toward the hook plate.

3. In combination with an eye plate having a slot and a bridge bar straddling the slot, the plate being downwardly inclined at one side of the slot to form a guiding surface, and a hook plate embodying a hook adapted to engage beneath the bridge bar, the initial engagement of the hook with the bridge bar being made at the opposite side of the bridge bar from the downwardly inclined portion of the plate, the eye plate being provided at the said opposite side of the slot with a hump frictionally engaging said hook during the insertion thereof.

4. In combination with an eye plate having a slot and a bridge bar straddling the slot, the plate being downwardly inclined at one side of the slot to form a guiding surface, and a hook plate embodying a hook adapted to engage beneath the bridge bar, the initial engagement of the hook with the bridge bar being made at the opposite side of the bridge bar from the downwardly inclined portion of the plate, the hook being provided with a hump frictionally engaging said eye plate adjacent the said opposite side of the slot thereof during the insertion of the hook beneath the bridge bar.

5. In combination with an eye plate having a slot and a bridge bar straddling the slot, the plate being downwardly inclined at one side of the slot to form a guiding surface, and a hook plate embodying a hook adapted to engage beneath the bridge bar, the initial engagement of the hook with the bridge bar being made at the opposite side of the bridge bar from the downwardly inclined portion of the plate, said hook and eye plate each embodying a hump, said humps frictionally engaging during the insertion of said hook beneath said bridge bar.

In testimony whereof I hereunto affix my signature.

WALTER H. FARNHAM.